United States Patent [19]

Wick et al.

[11] 4,182,554

[45] Jan. 8, 1980

[54] MOTION-PICTURE SOUND FILM PROJECTOR

[75] Inventors: Richard Wick, Munich; Eduard Wagensonner, Aschheim, both of Fed. Rep. of Germany

[73] Assignee: AGFA-Gevaert, A.G., Leverkusen, Fed. Rep. of Germany

[21] Appl. No.: 846,582

[22] Filed: Oct. 28, 1977

[30] Foreign Application Priority Data

Oct. 28, 1976 [DE] Fed. Rep. of Germany ....... 2649031

[51] Int. Cl.² ..................... G03B 31/00; G03B 31/02
[52] U.S. Cl. .................................. 352/5; 352/27
[58] Field of Search ................................. 352/5, 27

[56] References Cited

U.S. PATENT DOCUMENTS 3,907,412 9/1975 Schaller et al. ........................ 352/5

Primary Examiner—Monroe H. Hayes
Attorney, Agent, or Firm—Michael J. Striker

[57] ABSTRACT

The film is provided with an audio track comprised of recorded sections alternating with unrecorded sections. An adjustable mixer having first and second inputs is connected to the input of the sound-reproducing unit. A first signal-transmission path extends from the output of the audio head for the audio track to the first input of the mixer. A second signal-transmission path extends to the second input of the mixer and transmits a second audio signal thereto. A control head located upstream of the audio head senses the presence or absence of recorded information on the audio track and controls the operation of an attenuator connected in the second signal-transmission path. The control head is connected to the attenuator via a time-delay circuit which introduces a time delay corresponding to the distance between the two heads. The second audio signal is derived from a second audio track on the film, which bears recorded audio information along its entire length, or is derived from an uninterruptedly operated magnetic-tape playback machine or phonograph. During reproduction of the audio information on the recorded sections of the main audio track, the transmission of the second audio signal to the mixer is automatically attenuated.

11 Claims, 2 Drawing Figures

MOTION-PICTURE SOUND FILM PROJECTOR

BACKGROUND OF THE INVENTION

The invention relates to problems involving changeovers from audio information derived from one source to audio information derived from another source, during the audio playback incident to the projection of motion-picture sound film. An example of this type of problem would be a motion-picture sound-film recording of action accompanied by spoken dialogue, with music to be edited-in during certain time intervals, for instance during time intervals when action is occurring without spoken dialogue. Conventionally, this sort of changeover effect is implemented using editing-studio re-recording techniques or the like. In such a situation, after music has been edited-in onto the motion-picture sound film, the audio track thereon will no longer contain the original information; i.e., the music, or the like, will supplant the original audio recording, e.g., will supplant the recording of background dialogue not related to the filmed action.

SUMMARY OF THE INVENTION

It is a general object of the invention to provide a novel motion-picture sound film projector for film having a first audio track which has been only interruptedly recorded (i.e., in which recorded track sections alternate with unrecorded track sections), a control head capable of discriminating between the recorded and unrecorded audio-track sections, a sound-reproduction unit, and means for recording and effecting the reproduction of audio information on a second audio track, the reproduction of the second-track audio information to occur during the gaps in audio information on the first track, with the reproduction of the audio information of both tracks being actually performed by the sound-reproduction unit of the projector.

In particular, the changeover from the reproduction of first-track audio information to the reproduction of second-track audio information, during the gaps in the first-track audio information, is to be effected with simplicity and reliability.

Another object is to provide a projector so designed that inadvertent erasing of recorded audio information on one or the other track during such changeovers is precluded, especially accidental erasing of the first-track audio information.

A further object is to permit corrective editing or alteration of the audio information on one track without destroying or altering the information on the other track.

These objects, and others discussed below, can be met by providing, in the circuitry of the recording and playback means for the second track, an attenuator stage comprising a controllable resistance. The control head is operative for sensing the start and end of recorded sections on the first track and changing the resistance of the controllable resistance of the attenuator stage correspondingly. The control head controls the attenuator stage through the intermediary of a time-delay stage. The time-delay introduced corresponds to the distance between the control head and the record/playback head for the first track, or more precisely, the time required for a point on the film to travel that distance. The outputs of the record/playback units for the two tracks are connected to the input of an adjustable mixer stage, the output of which is connected to the input of the sound-reproduction unit per se.

This projection system differs from systems in which the second-track recording operation is performed on the portions of the second track corresponding to the unrecorded portions of the first track. In the present system, the first-track and the second-track recording operations are performed separately, and the first-track and second-track audio information retain separate identities at all times. First-track and second-track audio information are independently transmitted to the mixing stage, and from the output thereof to the sound-reproduction unit per se.

The mixing stage, which could be a simple adder, makes it possible to select in a very simple way the balance as between first- and second-track audio information, i.e., which information is to predominate during reproduction. Because the second-track audio information (e.g., music) need not be edited-in into the gaps in the first-track audio information (e.g., spoken dialogue), the second-track audio information (e.g., music) can be present in the form of an uninterrupted recording, corresponding to the entire length of the motion-picture sound film.

Because the first-track audio information (e.g., spoken dialogue) and the second-track audio information (e.g., music) are recorded on different audio tracks, corrective editing of the information on one track can be made freely and easily, without irretrievably destroying the audio information on the other track. Because the first-track audio information and the second-track audio information are always available on their respective tracks, one is not committed to permanent selection of the balance as between the two tracks. For example, in the case of spoken dialogue interspersed with music, the reproduction level (i.e., loudness) which the music is to have when it comes in during a spoken-dialogue interruption, can be changed, each time the film is projected, or vice versa.

Advantageously, the second audio-information track is provided on the motion-picture film itself, and most preferably the anyway present balance stripe, running along the edge of the film opposite to that provided with the ordinary audio track, is utilized for this purpose. However, it would also be possible to provide the second track on a structure discrete from the motion-picture film, e.g., on the magnetic tape of a tape recorder and playback machine or as the spiral track of a phonograph record on a phonograph.

The aforementioned time-delay stage advantageously includes a charging rectifier, a storage capacitor, a threshold stage (e.g., a Schmitt trigger) across whose input the storage capacitor is connected and, connected to the output of the threshold stage, an RC-stage. The charged storage capacitor commences to discharge, when the control head senses that a recorded section of the first audio track has ended; this discharge requires a time interval corresponding to the time required for a point on the film to travel the distance from the control head to the record/playback head for the first track. When this time interval has elapsed, the threshold stage undergoes a change of state, and the capacitance of the RC-stage connected to the threshold-stage output is thereby permitted to charge or discharge.

Because of the manner in which the inventive projector system can operate, the record/playback head for the second audio track (when the latter is provided on the film itself) can be located anywhere along the path of film travel. However, it is also contemplated that the record/playback heads for the two audio tracks be combined into a single structural unit, for example sharing common structure, such as common mounting structure.

According to one concept of the invention, the mixing stage is essentially comprised of a resistor joining together the outputs of the record/playback stages of the two tracks, and via the wiper of a potentiometer connected in the circuitry of the end stage of the sound-reproduction unit per se.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
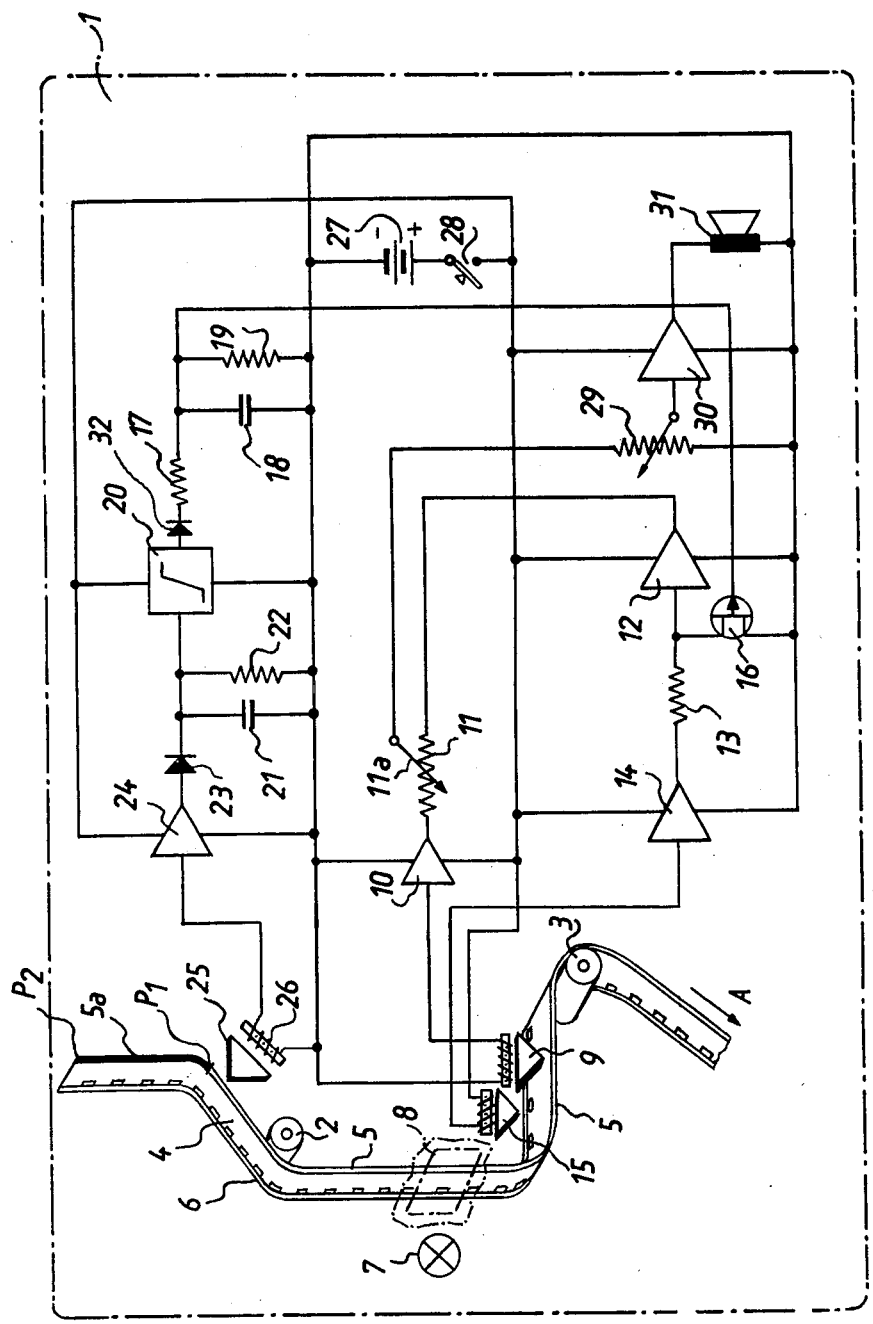
FIG. 1 depicts a first embodiment of the invention.

In FIG. 1, numeral 1 generally denotes a motion-picture sound film projector. Rollers 2, 3 guide film 4 along a predetermined path. The film 4 is provided with a first audio track 5 and with a balancing stripe 6 here utilized as a second audio track. For the purpose of explanation, it is assumed that speech is recorded on first audio track 5, and music on second audio track 6. A recorded section of first track 5, i.e., upon which speech is actually recorded, is denoted by 5a, and its start is denoted by P1. The film 4 travels in the direction of arrow A. The projector lamp is denoted by 7, and the projection window by 8.

A record/playback head 9 for the first track 5 is connected to an amplifier 10, whose output is connected via a resistor 11 to the output of an amplifier 12. The input of amplifier 12 is connected via a resistor 13 to the output of a preamplifier 14, the input of which is connected to the record/playback head 15 for the second audio track 6.

Resistor 13 and a field-effect transistor 16 together form an adjustable voltage divider, from the voltage-divider tap of which voltage is transmitted to the input of amplifier 12, with an adjustable voltage-division factor.

The control electrode of field-effect transistor 16 is connected to the output of an RC-stage comprised of a resistor 17, a capacitor 18, and a further resistor 19. The charging and discharging of capacitor 18 is controlled by a threshold circuit 20 (e.g., a Schmitt trigger). Connected across the input of threshold circuit 20 is a storage capacitor 21, and in parallel to the latter a resistor 22. A charging rectifier 23 is connected between the storage capacitor 21 and the output of an amplifier 24. The input of amplifier 24 is connected to the coil 26 of a control pick-up head 25 operative for sensing the presence of recorded audio information on first audio track 5. Control head 25 is located upstream of the two audio heads 9, 15, as considered in the direction of film transport.

Numeral 27 denotes a battery, and numeral 28 a battery-connect switch.

The resistor 11 is a potentiometer resistor and provided with a wiper 11a, the latter being connected to one end terminal of the resistor of a potentiometer 29. The wiper of potentiometer 29 is connected to the input of the end-stage amplifier of the sound-reproduction unit per se, the output circuit of which includes a speaker 31.

The exemplary embodiment shown in FIG. 1 operates as follows:

The second audio track 6 (the balance stripe) is recorded with music along its entire length, i.e., uninterruptedly. In contrast, the first audio track 5 is recorded with speech only along certain sections thereof, such as at the illustrated recorded section 5a. When the leading end P1 of recorded section 5a reaches the control head 25, the latter transmits an A.C. signal to the amplifier 24. The output signal of amplifier 24 is transmitted through charging rectifier 23 and is applied as a D.C. voltage to the storage capacitor 21, causing the latter to charge. When the voltage across capacitor 21 reaches the threshold level of threshold circuit 21, the latter undergoes a change of state, in this case from high to low output potential. Accordingly, the capacitor 18, which up to this point was permitted to charge up to battery potential, can now discharge through resistor 19. The control electrode of the hitherto non-conductive FET 16 becomes increasingly biased for conduction. The time required for capacitor 21 to charge up to a voltage which changes the state of threshold circuit 20, and the time constant of the resistor-capacitor combination 18, 19, are so selected that the FET 16 becomes fully conductive by the time the leading end P1 of the recorded section 5a has actually reached the audio head 9 for the first audio track 5. With FET 16 conductive, the transmission of audio information (music) from second-track audio head 15 and amplifier 14 to amplifier 12 becomes greatly attenuated. To an extent corresponding to the setting of potentiometer 11, it is now the first-track audio information (speech) whose transmission to speaker 31 predominates, i.e., via potentiometer 29 and amplifier 30.

When now the trailing end P2 of the recorded section 5a reaches the control head 25, the output signal of amplifier 24 becomes zero. The charge accumulated in storage capacitor 21 can now discharge through resistor 22. The discharge time of capacitor 21 is so selected, that the ensuing reversion of threshold circuit 20 to its original state occurs when the trailing end P2 reaches the audio head 9 for the first track 5. When the input voltage to threshold circuit 20 falls below the threshold level thereof, and circuit 20 reverts to its original state, its output potential is again high. As a result, capacitor 18 charges back up to battery potential again, via charging resistor 17 and a charging diode 32. The resistance of the FET 16, which was low during the reproduction of the recorded speech on recorded section 5a, becomes increasingly high, and FET 16 becomes fully non-conductive when capacitor 18 has fully charged. Accordinlgy, it is again the audio information from the second track 6 (music) which is transmitted, unattenuated, to the speaker 31.

In the foregoing explanation, and in the illustration of FIG. 1, emphasis has not been placed upon the recording operations per se, because the greater difficulty to be overcome relates to the playback changeovers. However, it is pointed out that the audio heads 9, 15 are indeed record/playback heads, capable of recording onto their respective tracks 9, 15, but for simplicity the recording circuitry and pick-ups which are to be understood as connected thereto are not expressly depicted. When speech (i.e., spoken conversation accompanying filmed action) is recorded on the conventional audio track 5 and music is recorded on the balance stripe 6—the simple and ordinary case assumed here for purposes of explanation—, the projector could have recording capability in connection with the head 15 for the second track 6 only, inasmuch as the recorded conversation on track 5 will ordinarily have been recorded thereon during filming.

Figure 2:
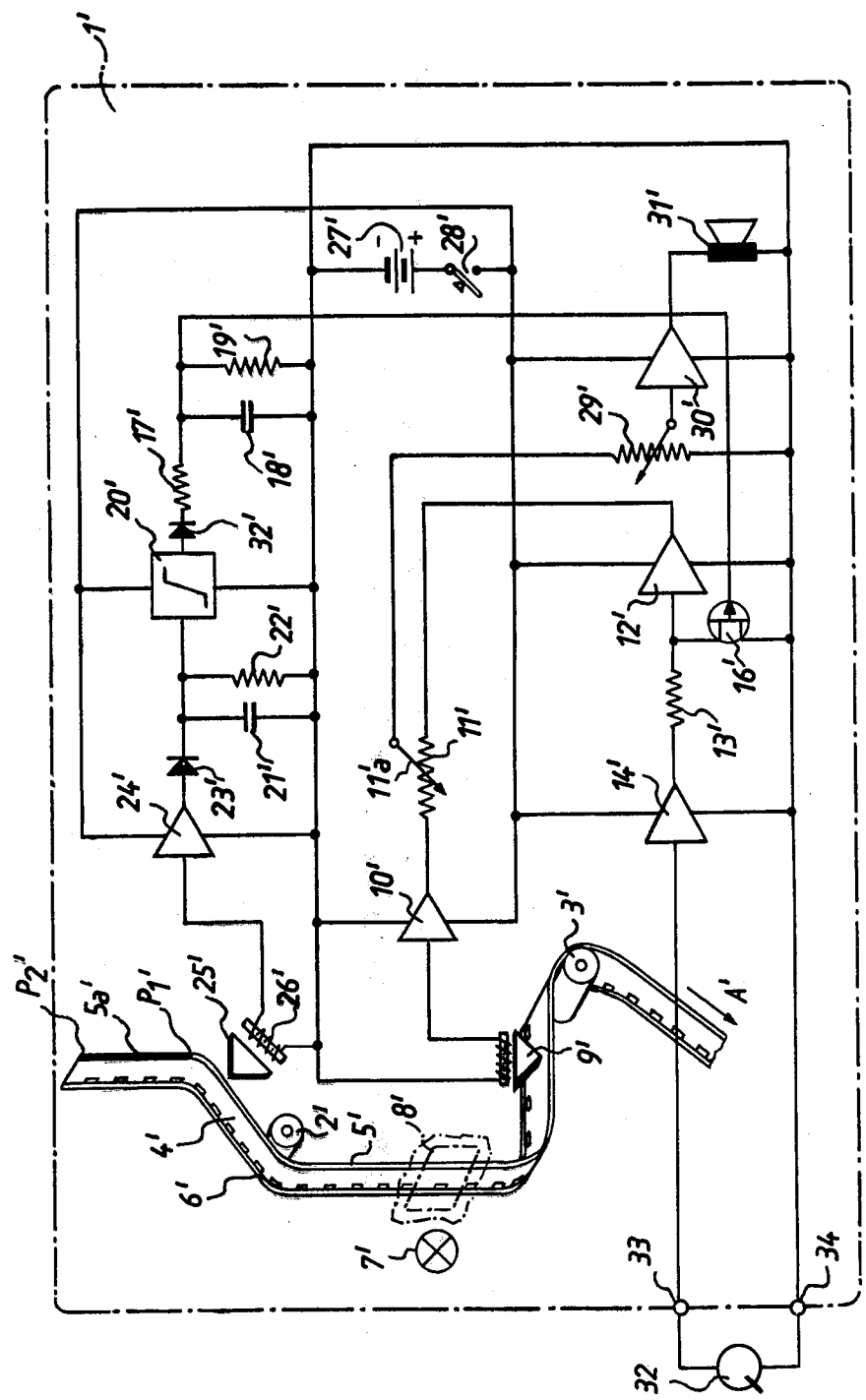
FIG. 2 depicts another embodiment of the invention.

The embodiment depicted in FIG. 2 is similar to that of FIG. 1, and components corresponding to those of FIG. 1 are denoted by the same reference numerals, primed. However, in the embodiment of FIG. 2, the balance stripe 6 is not utilized as the second audio track, and the second audio head 15 is eliminated. Instead, the input signal to amplifier 14' comes from a tape recorder 32, connected to amplifier 14' at terminals 33, 34. I.e., the second audio track is constituted by the magnetic tape played by the tape recorder 32. The playback machine 32 could equally well be a phonograph, in which case the second audio track in question would be constituted by the spiral groove of a phonograph record played thereon.

It will be understood that each of the elements described above, or two or more together, may also find a useful application in other types of circuits and constructions differing from the types described above.

While the invention has been illustrated and described as embodied in playback changeovers as between recorded speech and recorded music, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a motion-picture sound film projector in which motion-picture sound film is transported along a predetermined path and is provided with an audio track consisting of recorded track segments alternating with unrecorded track segments, in combination, sound-reproducing means operative for receiving audio signals and converting them into audible sound; adjustable mixing means having an output connected to the input of the sound-reproducing means and having first and second inputs for receipt of first and second audio signals, and operative for mixing received first and second audio signals with an adjustable balance as between the first and second audio signals; a first audio head located along the film transport path and operative for converting the audio information on the audio track of the film into a first audio signal; first audio-signal transmission means forming a first signal-transmission path extending from the first audio head to the first input of the mixing means; second audio-signal transmission means for transmitting to the second input of the mixing means a second audio signal and forming a second signal-transmission path extending to the second input of the mixing means; controllable attenuating means connected in the second signal-transmission path and controllable for attenuating the transmission of signals through the second signal-transmission path; and control means operative for controlling the operation of the controllable attenuating means, the control means including a control audio head, the control audio head being located along the film transport path a predetermined distance upstream of the first audio head and being operative for sensing the presence of recorded audio information on the recorded sections of the audio track of the film and generating a signal indicative of such presence, and time-delay means connecting the output of the control audio head to the controllable attenuating means and operative for introducing into the response of the attenuating means to the signal produced by the control audio head a time delay whose duration corresponds to the time required for the film to be transported said predetermined distance.

2. In a projector as defined in claim 1, the film being of the type provided with a balance stripe, audio information being recorded on the balance stripe; further including a second audio head located along the film transport path and operative for converting the audio information on the balance stripe of the film into a second audio signal, the output of the second audio head being connected to the input of the second audio-signal transmission path.

3. In a projector as defined in claim 1, the second audio-signal transmission means being provided at its input with input connecting means for connecting the input of the second signal-transmission means to the output of a sound-reproducing machine discrete from the film projector.

4. In a projector as defined in claim 1, the time-delay means including a threshold circuit having an input and an output, a charging rectifier and a storage capacitor connecting the output of the control audio head to the input of the threshold circuit and operative in response to a signal from the control audio head for charging the capacitor to cause the voltage on the capacitor to reach the threshold level of the threshold circuit, and a resistor-capacitor time-delay stage connecting the output of the threshold circuit to the controllable attenuating means.

5. In a projector as defined in claim 4, the threshold circuit assuming a first or a second state depending upon whether the voltage on the storage capacitor is below or above the threshold level of the threshold circuit, the time-delay means furthermore including a discharge resistor connected in circuit with the storage capacitor, the charging rectifier, storage capacitor and discharge resistor being interconnected such that the storage capacitor is charged through the charging rectifier when the control audio head produces a signal and discharges through the discharge resistor when the control audio head ceases to produce a signal, the charging time of the storage capacitor being short relative to the duration of said time delay, the discharge time of the storage capacitor approximately corresponding to the duration of said time delay, the resistor-capacitor time-delay stage including a resistor and a capacitor connected to the output of the threshold circuit such that the capacitor of the time-delay stage charges or discharges depending upon whether the threshold circuit is in its first or second state, and further including means connecting the capacitor of the time-delay stage to the controllable attenuating means for controlling the attenuation introduced by the latter in dependence upon the voltage across the capacitor of the time-delay stage.

6. In a projector as defined in claim 2, the first and second audio heads together forming a single structural unit.

7. In a projector as defined in claim 1, the sound-reproducing means including a speaker and an end-stage circuit having an output connected to the input of the speaker and having an input, and a potentiometer having a wiper connected to the input of the end-stage circuit, the adjustable mixing means comprising a potentiometer including a potentiometer resistor connected to the outputs of the first and second signal-transmission paths and having a wiper connected to the potentiometer of the sound-reproducing means.

8. In a motion-picture sound film projector in which motion-picture sound film is transported along a predetermined path and is provided with an audio track consisting of recorded track segments alternating with unrecorded track segments, in combination, sound-reproducing means operative for receiving audio signals and converting them into audible sound; mixing means having an output connected to the input of the sound-reproducing means and having first and second inputs for receipt of first and second audio signals, and operative for mixing received first and second audio signals an audio head located along the film transport path and operative for converting the audio information on the audio track of the film into a first audio signal; first audio-signal transmission means forming a first signal-transmission path extending from said audio head to the first input of the mixing means; second audio-signal transmission means for transmitting to the second input of the mixing means a second audio signal and forming a second signal-transmission path extending to the second input of the mixing means; controllable attenuating means connected in the second signal-transmission path and controllable for attenuating the transmission of signals through the second signal-transmission path; means operative during film transport for generating a signal indicative of the presence or absence of recorded audio information on a particular segment of the audio track of the film; and means operative in dependence upon the latter signal for controlling the operation of the controllable attenuating means, wherein said means controlling the controllable attenuating means comprises means for introducing into the response of the attenuating means to the signal indicative of the presence of recorded audio information a time delay whose duration corresponds to the time required for such audio track segment to reach the audio head.

9. A method of reproducing sound motion-picture film comprising the steps of transporting sound motion-picture film having an audio track through a sound motion-picture film projector having a playback head and sound-reproducing means, the audio track being constituted by recorded audio track segments on which audio information is recorded interspersed with unrecorded audio track-segments on which audio information is not similarly present, and audibly reproducing the recorded segments of the audio track using the playback head and sound-reproducing means of the projector; uninterruptedly generating an auxiliary audio signal both during the time intervals when the audio information on the audio track is being reproduced and also during the time intervals intermediate the time intervals when the audio information on the audio track is being reproduced, the auxiliary audio signal not being derived from the audio track on the film; during transport of the film through the projector applying the auxiliary audio signal to the sound-reproducing means of the projector to effect audio reproduction of the auxiliary audio signal during the time intervals intermediate the time intervals when audio information on the audio track is being reproduced, this comprising using a pick-up head mounted on the projector to detect the presence of audio information recorded on a recorded segment of the audio track and to generate a signal indicative of such detection, and applying the last-mentioned signal, with a time-delay corresponding to the time required for the detected segment to reach the playback head, to control means operative for controlling the transmission to the sound-reproducing means of both the audio information recorded on the audio track and the auxiliary audio signal.

10. A method as defined in claim 9, uninterruptedly generating the auxiliary audio signal by using for the sound motion-picture film a film having in addition to the audio track a balance stripe along the length of which audio information is uninterruptedly recorded and reproducing the information uninterruptedly recorded on the balance stripe to thereby generate the auxiliary audio signal using a playback head mounted on the projector to pick up the audio information recorded on the balance stripe.

11. A method as defined in claim 9, uninterruptedly generating the auxiliary audio signal by uninterruptedly operating an audio playback machine discrete from the sound motion-picture film projector.

* * * * *